US005666812A

United States Patent [19]

Packo

[11] Patent Number: 5,666,812
[45] Date of Patent: Sep. 16, 1997

[54] APPARATUS AND PROCESS FOR RENEWING REFRIGERANTS

[75] Inventor: Joseph J. Packo, Isle of Vieques, Puerto Rico

[73] Assignee: IPG Corporation, Vieques, Puerto Rico

[21] Appl. No.: 666,992

[22] Filed: Jun. 19, 1996

Related U.S. Application Data

[60] Provisional application No. 60/005,779 Oct. 20, 1995
[51] Int. Cl.[6] ....................................... F25B 47/00
[52] U.S. Cl. ........................... 62/85; 62/475; 62/303
[58] Field of Search .................... 62/85, 292, 149, 62/303, 475

[56] References Cited

U.S. PATENT DOCUMENTS

| 4,237,172 | 12/1980 | Packo et al. . | |
|---|---|---|---|
| 4,331,722 | 5/1982 | Packo et al. . | |
| 4,379,067 | 4/1983 | Packo et al. . | |
| 4,442,015 | 4/1984 | Packo et al. . | |
| 4,508,631 | 4/1985 | Packo et al. . | |
| 5,036,675 | 8/1991 | Anderson, Jr. | 62/303 |
| 5,050,388 | 9/1991 | Packo . | |

Primary Examiner—John M. Sollecito
Attorney, Agent, or Firm—Browdy and Neimark

[57] ABSTRACT

A system for purifying a refrigerant (ammonia, Freon, etc.) puts impure liquid refrigerant into a container with a liquid chemical that reacts chemically with the impurity (water, acid, etc.) to form a solid or liquid. The vaporization temperatures of the chemical and the reaction product is substantially higher than that of the refrigerant. The chemical does not react with the refrigerant. The impure refrigerant is added to the liquid decontaminant in such a way as to cause vigorous mixing so that efficient reaction occurs between the liquid decontaminant and one or more of the impurities. The refrigerant is allowed to evaporate out of the container. Since the reaction product stays in the container, the refrigerant vapor is very pure. The vaporization temperature of the reaction product is higher than that of the impurity, so that the purity of the refrigerant vapor is much greater than the vapor resulting from straight distillation.

14 Claims, 3 Drawing Sheets

APPARATUS AND PROCESS FOR RENEWING REFRIGERANTS

CROSS-REFERENCE TO RELATED APPLICATION

This application claims priority from Provisional application Ser. No. 60/005,779 filed on Oct. 20, 1995, the contents of which are hereby incorporated by reference.

FIELD OF THE INVENTION

The present invention relates to renewing (purifying) refrigerant fluids which change state between liquid and gas phases during cycling in refrigeration and air-conditioning (AC) circuits.

BACKGROUND OF THE INVENTION

Refrigerants such as chlorofluorocarbons (CFCs), ammonia and the newer chlorocarbons are used in mechanical refrigeration and AC systems, in which the refrigerants are condensed and evaporated, typically at a low temperature. Inevitably, through use and sometimes from outside contamination, the refrigerants can become dirty and polluted, lowering the efficiency of the AC or refrigeration system and sometimes leading to corrosion of the pipes or tubes, as well as escape of the refrigerant. Typical pollutants are water and acids.

In the past, polluted refrigerants have usually been simply discarded, but this is wasteful and expensive. In addition, certain refrigerants are harmful to the environment. Ammonia is poisonous and CFCs deplete ozone in the upper atmosphere.

One solution to the problem of refrigerant pollution, which was developed by the present inventor, is to add chemicals to the refrigerant which react with pollutants to form useful or at least safe compounds. For example, dehydrating and acid neutralizing agents that will react with the moisture and acids in the contaminated refrigerant can be used as shown in Packo U.S. Pat. No. 4,508,631. Other Packo patents (see U.S. Pat. Nos. 4,331,722; 4,379,067; 4,442,015; and 4,237,172) disclose the reaction of additives with moisture to seal holes which develop in the pipes or tubes. And in Packo U.S. Pat. No. 5,050,388, a method is disclosed for reclaiming refrigerant by reducing its moisture content through the use of such chemicals.

Others in the art have developed reclaiming and recycling systems to purify refrigerant, as opposed to converting the impurities to another form. These other systems rely primarily on filters and/or temperature and pressure cycles that distill the refrigerant. They do not yield consistent purity and are expensive to manufacture, maintain and operate. Filters impede flow, become clogged, lose efficiency, and must be replaced. Distillation does not eliminate any impurity which has a boiling point that is not much higher than that of the refrigerant.

SUMMARY OF THE INVENTION

Accordingly, the present invention has for an object, among others, to overcome deficiencies in the prior art such as noted above.

The present invention contemplate a simple system including an apparatus into which the refrigerant in liquid form containing contaminants flows. Inside the apparatus the refrigerant is admixed with one or more decontaminating chemicals which convert the contaminants into substantially non-volatile form from which the refrigerant in purified form is then volatilized for reuse. By "substantially non-volatile form" what is meant is that the material in question, e.g. the converted contaminant, is either solid or a liquid which boils at a substantially higher temperature than the refrigerant. The apparatus involves a suitable refrigerant reactor-container that desirably directs liquid refrigerant to admix with the decontaminating chemical in the lower part of the container. It also includes a means for discharging neat refrigerator gas from the container for reuse.

One embodiment of the apparatus of the present invention may be a container with an inlet valve attached to a dip tube extending to the bottom of the container configured so as to create a flow which admixes the refrigerants with the decontaminating chemical, and an outlet valve located to discharge neat refrigerant gas for reuse. Other methods and structures for mixing the refrigerant with the decontaminating liquid may also be used.

It is also contemplated that the decontaminating liquid contain or comprise chemicals which react with the contaminants or pollutants in the refrigerant to form by-products which not only have a higher boiling point than the refrigerant, but which also are inert to the refrigerant and compatible with the system material. The chemical reagents do not have to be necessarily miscible or end-blocked, but they must have a boiling temperature substantially higher than the boiling point of the refrigerant. Anyone skilled in chemistry can identify and select these chemical agents, including some which may be known from the prior art including U.S. Pat. Nos. 5,050,388 and 4,508,631, and others noted above.

The apparatus and process of the present invention are, in certain embodiments thereof, improvements over what is described in U.S. Pat. No. 5,050,388.

In the present invention, contaminated refrigerant flows through and admixed with the higher boiling decontaminating chemical liquids and its reaction products during which time the moisture and acids react to become higher boiling reaction products, leaving the refrigerant to vaporize as pure refrigerant for reuse. Thus, pure refrigerant leaves the reaction tank or vessel as vapor, and all the impurities and excess decontamination chemical agents and reaction products remain in the reaction vessel tank.

By contrast, the U.S. Pat. No. 5,050,388 teaches injecting the dehydrated fluids into the refrigerant stream and allowing them and their reaction products with the contaminants to remain in the refrigerant as foreign substances until the reaction particulates are preferably removed by standard filters, and wherein some quantities of the dehydrating fluids continue to travel with the refrigerant. This has the drawback that refrigerant containing foreign substances, even though they are less harmful than the original pollutants such as moisture and acid, may not pass tests for refrigerant purity.

The apparatus of the present invention can be used in conjunction with a recycler type machine, it can stand alone with a compressor or vacuum pump, or it can be attached to a running air conditioning or refrigeration system which then acts as an in situ circulative purifying apparatus.

The present system utilizes an apparatus which is simple to build and operate; it achieves high purity levels; it is less expensive to manufacture and maintain than prior-art systems; and the decontaminating chemicals are inexpensive. It is lighter in weight and easier to handle than any prior-art apparatus.

Other optional features of the present invention which may be included as desirable are:

(1) dip tube with split outlet ends for directional control for better mixing function;

(2) a moisture indicator, pressure gauge and thermometer attached to the outlet valve or the container;

(3) a third valve for releasing non-condensable gases;

(4) a high pressure release valve;

(5) "one-way-only" check valves to insure correct hook-up and flow function;

(6) a means of heating or cooling the container to control the rate of vaporations, such as an electric heat band or an insulating container jacket with dry ice pockets or the like;

(7) the container may be disposable or reusable;

(8) protection against overfill; and (9) electrical or compressed air compressor for removing or condensing contaminated purified refrigerant.

The industrial applicability is in cleaning refrigerants. The problem solved by the invention is lack of sufficiently inexpensive and effective refrigerant cleaning systems and especially apparatus.

BRIEF DESCRIPTION OF THE DRAWING

The above and other objects and the nature and advantages of the present invention will become more apparent from the following detailed description of an embodiment[s] taken in conjunction with drawings, wherein.

DETAILED DESCRIPTION OF THE PREFERRED EMBODIMENT

Figure 1:
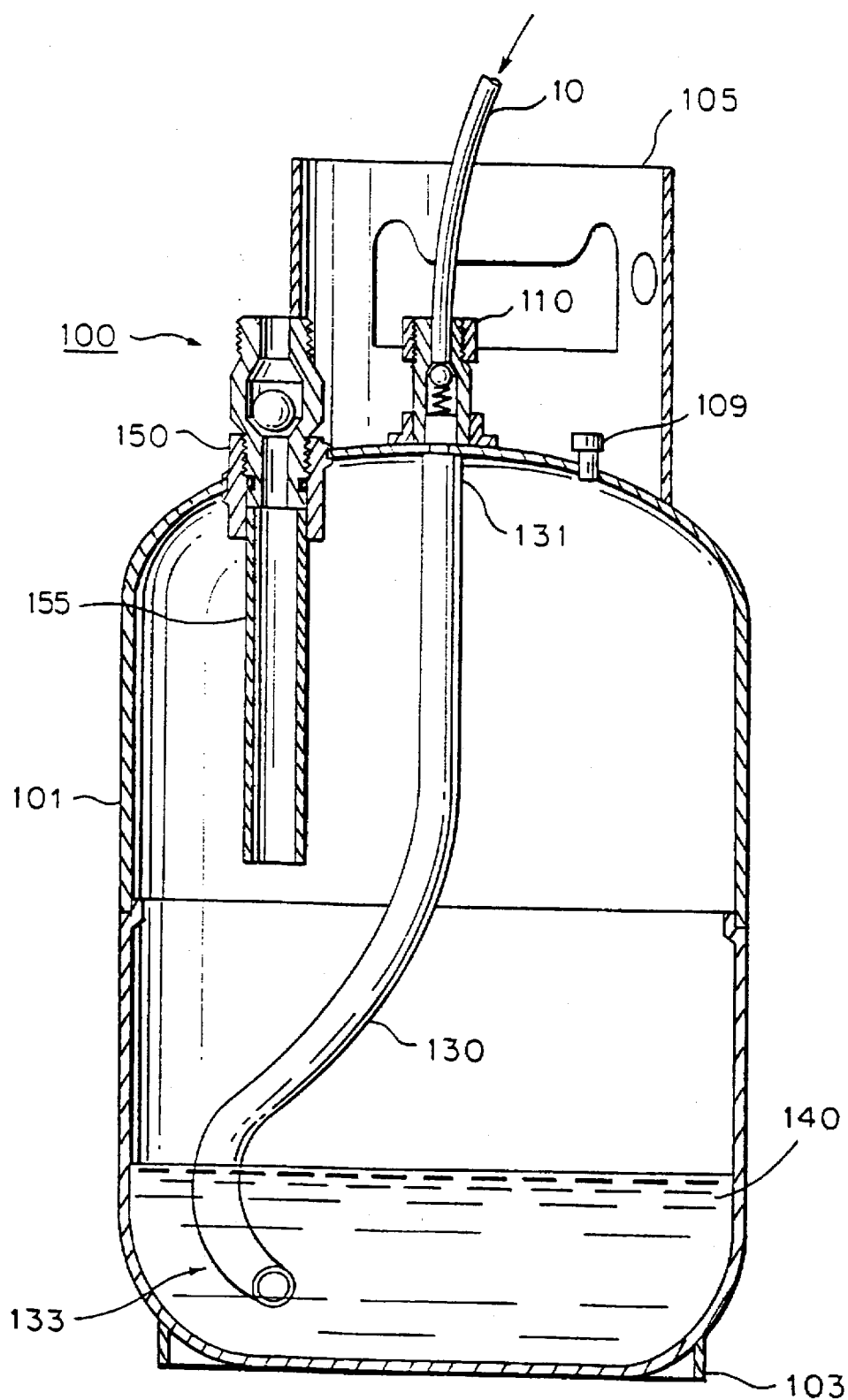
FIG. 1 is a vertical cross-sectional elevational view of the container-reactor of the invention, taken along line I—I of FIG. 2.

FIG. 1 shows a container-reactor 100 which is used by the present invention to purify refrigerants such as CFCs, HCFCs, HFCs and ammonia; indeed, by proper selection of the decontaminant liquid as one having a boiling point substantially higher than the boiling point of the refrigerant, and yielding reaction products also having a boiling point substantially higher than the refrigerant, the present invention can be tailored to any known refrigerant. The container preferably includes one or more side walls, but preferably a cylindrical side wall 101 and rounded top and bottom portions, a base 103, and a carrying handle/guard 105. It may be constructed in the conventional manner of steel, e.g. stainless steel, or other strong material, e.g. heavy duty plastic resistant to the refrigerant and the selected purifying liquids and their reaction products.

At the top of the container is an inlet connection 110 which couples to an inlet pipe 10 from the AC or refrigeration circuit. The inlet connection preferably includes a conventional one-way valve, such as for example the spring-loaded ball valve shown in the figure, for admitting liquid refrigerant from the refrigeration system or from a pump (shown in FIG. 2). On the inside of the inlet connection 110 is a tube 130 which has top end 131 communicating with the pipe 10 through the refrigerant inlet 110, a descending portion, and a discharge end 133 at the bottom.

The discharge end 133 is immersed in a liquid decontaminating chemical or chemical liquid mixture 140 which does not react chemically with the refrigerant but does react with impurities or pollutants in the refrigerant; this reaction is most preferably a chemical reaction, but may be another sort such as a physical reaction, e.g. a chelation or a dissolution of the impurity in the chemical, and so on; or the reaction may combine physical and chemical reactions.

Figure 1A:
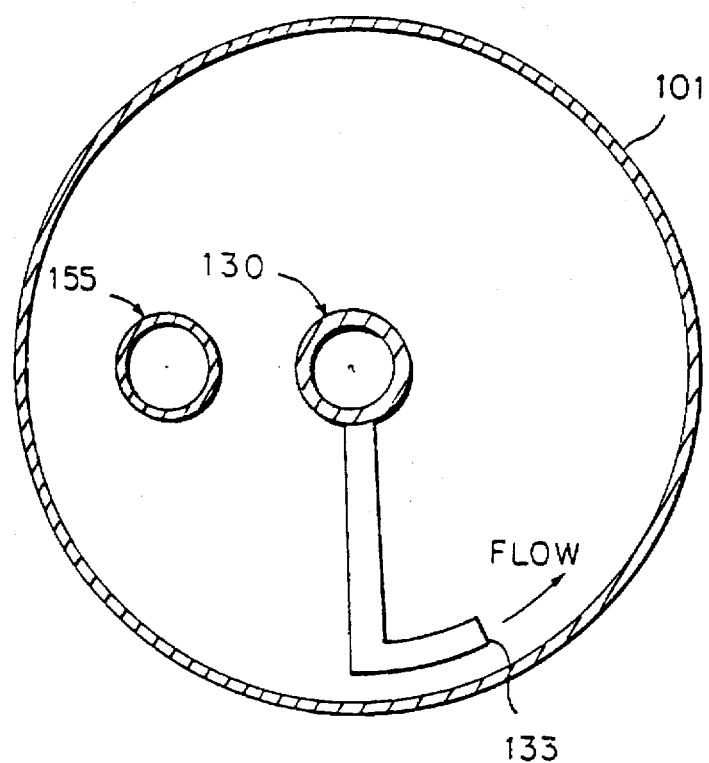
FIG. 1A is an inside partly sectional top view of the container-reactor of FIG. 1.

As the tube 130 descends from the inlet connection 110, which is preferably located in the middle of the upper portion of the container 100, it turns outward (i.e., generally radial to the container axis) and turns again near the discharge end 133 toward a lateral direction (generally perpendicular to both the container axis and a radius line of the container, and skew to the axis) such as shown in FIG. 1A. The discharge end 133 thus discharges refrigerant into the decontaminating liquid 140 in such a way as to impart a swirling motion that causes thorough mixing of the refrigerant and decontaminating liquid 140. This mixing causes the liquid decontamination to react rapidly with all the impurities in the refrigerant.

Figure 3:
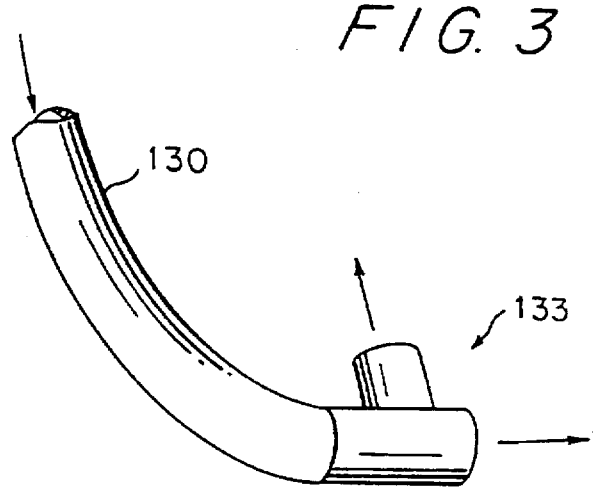
FIG. 3 shows split tube outlet ends.

The discharge end 133 may optionally be split to produce two or more jets, which jets may interact to produce greater turbulence. A split discharge end 133' is shown in FIG. 3.

Other conventional methods and apparatus for mixing may also be used in the present invention, such as mechanical stirrers, increasing convection in the admixture by insulating one side of the container 100, baffles built into the container 100, bubbling vapor through the admixture, use of a nozzle on the discharge end 133, and so on. The liquid refrigerant may also be injected from an inlet located in other positions than centrally on the top side of the container 100.

The impurities are chemically (or otherwise) converted to solids, gels, liquids of high boiling point, and/or other reaction products which will not escape along with refrigerant vapor from the swirling admixture of liquid refrigerant and excess liquid chemical reagent 140 because their vaporizations temperatures are high compared to that of the refrigerant. The reaction products may also and preferably do have a substantially higher vaporization temperature than the impurities they replace.

The reaction products, if liquid rather than solid, can be either miscible or not miscible with the refrigerant, with the decontaminating chemical, or with the admixture of the two. The reaction product may include solids and gels. While in theory the preferred liquid decontaminant chemicals may be selected from some of those of U.S. Pat. Nos. 5,050,388 and 4,508,631, it is crucial that such decontaminant liquids used in the present invention have a sufficiently high boiling point. For most cases and with respect to most modern refrigerants, the decontaminating liquid reagent should have a boiling point greater than 85° C., preferably at least 100° C., and most preferably 115° C. or more.

The container is maintained at a temperature and pressure at which the refrigerant boils, but the one or more liquid decontaminating reagents 140 do not. It will be understood that the decontaminant 140 is chosen for the particular refrigerant to be purified, such that the reaction product or products formed in the admixture at the bottom of the container 100 by reactions between the impurities carried by the refrigerant and the decontaminant 140 do not boil or sublimate at or above the temperature and pressure which are maintained in the container 100 to boil the refrigerant. Thus, with proper choice of decontaminating reagent 140, substantially only refrigerant passes into the gaseous state inside the container 100.

The refrigerant vapor resulting from boiling (evaporation) is allowed to leave the container 100 through an outlet connection 150 through the container wall 101. Like the inlet connection 110, the outlet connection 150 preferably includes a one-way valve such as a ball-check valve;

however, the valve orientation is reversed from that of the inlet valve 110 so that vapor may leave the container 100 but not flow back in once outside. The outlet connection 150 may be of the screw-thread type, so as to be easily removable to provide an opening for convenient addition of a new batch of liquid decontaminant, and then easy replacement of the outlet connection 150.

To prevent overfilling, the outlet 150 may include a downwardly-extending tube 155, which will cause pressure to build up once the admixture of refrigerant and decontaminating liquid reagent 140 reaches the lower orifice of the tube 155. Other conventional overfill protection may also be used. A pressure relief valve 109 is preferably included in the upper portion of the container 100 to prevent buildup of dangerously high pressures in the event of blockage. The relief valve 109 may be set to release at a pressure higher than the refrigerant supply pressure but lower than the safe pressure for the container 100.

Figure 2:
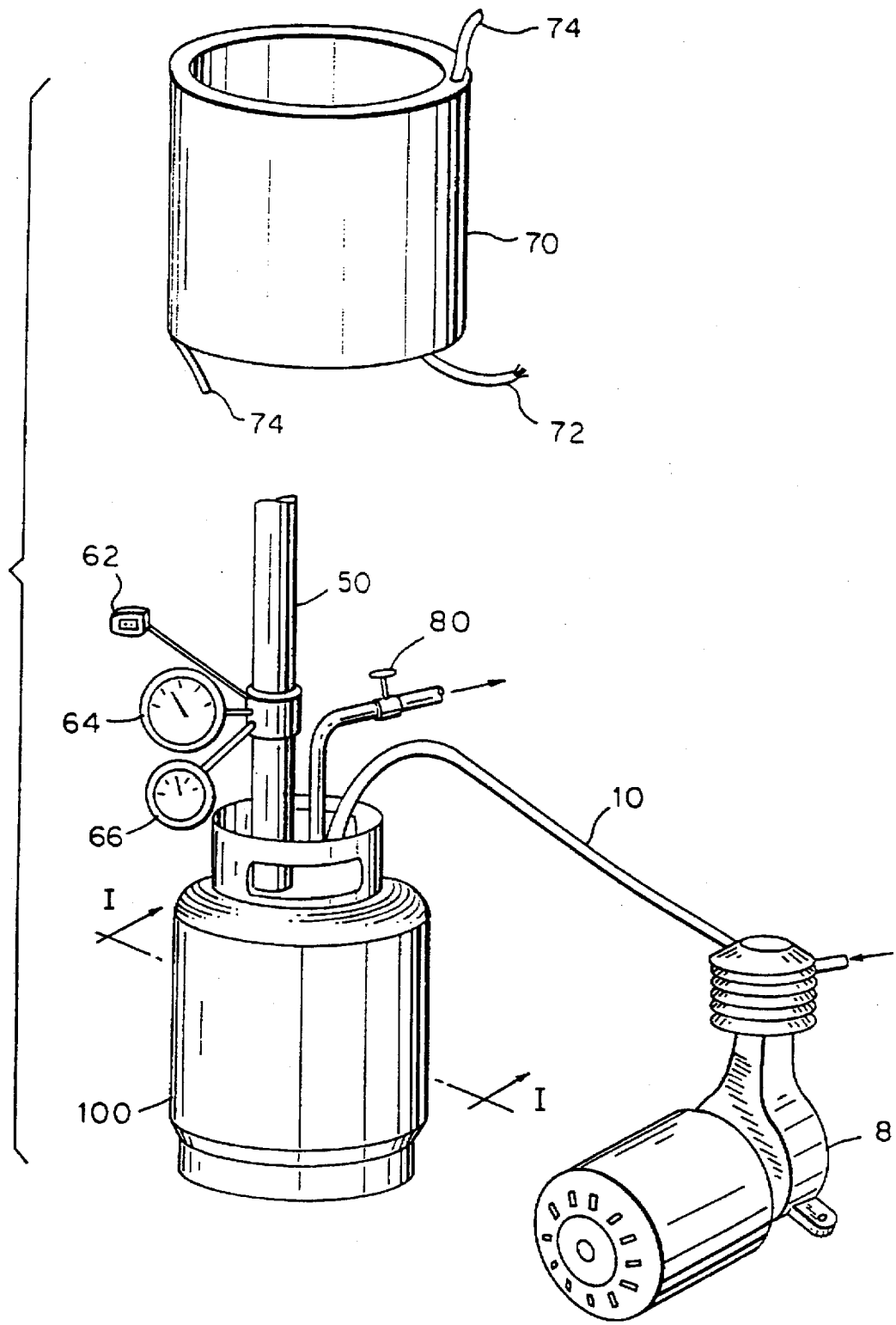
FIG. 2 is an overview of the invention.

FIG. 2 also shows a thermal jacket 70 that may include an electric heating coil with leads 72, a conduit 74 for conducting cooling fluid to pass near the container 100, and thermal insulation. The thermal jacket can be used to regulate the rate of evaporation of the refrigerant. However, because typical refrigerants boil at temperatures below room temperature, the present invention does not normally require the thermal jacket 70. Heating and cooling are optional, and the purifying apparatus of the present invention is a chemical purifier, not a still. It can use heat from the environment to cause evaporation. All means for controlling the evaporation rate of the refrigerant are within the scope of the invention.

A compressor 8 may be used to pressurize the refrigerant prior to injection into the container 100 via the pipe 10. The container 100 may also be included as part of a complete refrigeration system (not shown) and be fed from the regular compressor of the system, in which case the compressor 8 is not required.

A refrigerant vapor hose 50 conducts the vapor away from the container. If the container 100 is part of a refrigeration system, then the vapor may be returned directly to the system. The container 100 will absorb heat, and may be used as an auxiliary cooling device within a system.

If the container 100 is built into a refrigeration system, it may be mounted permanently and will preferably omit the guard/handle 105, base 103, and other parts such as the pressure relief valve 109. The container 100 may be either reusable or discardable, regardless of whether it is includable as part of a system. The hose 50 and the pipe 10 may be both flexible. In one preferred embodiment, the container is formed of an inexpensive material, e.g. plastic, and the decontaminant liquid in a single dose amount for purification of an AC or refrigeration circuit is provided in the container 100, i.e. they are sold as a single unit and then discarded after a single use.

Particularly for a reusable apparatus, attached to the hose 50 are a moisture indicator, pressure gauge, and thermometer. These may alternatively be attached to the container 100, or some other part of a system which includes the container 100. Other indicators and gauges are also within the scope of the present invention, particularly containers 100 constructed for repeated re-use. A third valve 80 (not shown in FIG. 1) may be included in the container 100 for releasing non-condensable gases (other than refrigerant vapor).

The vapor leaving the container 100 is extremely pure because the pollutants and impurities, now converted to reaction products of high boiling point, are left behind in the admixture of high-boiling reagent 140 and refrigerant.

Table 1, below, lists a variety of alkoxysilanes and sodium salts of primary alcohols useful in the removal of water and halogen acids from refrigerants; this list is exemplary and the present invention is not limited to the listed chemicals. This table also gives the theoretical amounts of decontaminant liquid 140 needed to treat 1,000 pounds of refrigerant, assuming that the amounts of water and halogen acids do not exceed 200 ppm, respectively. If organic acids are also present as impurities, more decontaminant 140 than that shown may be necessary.

For background information, at 200 ppm, the amount of water in 1,000 lbs. of refrigerant is 0.2 lbs. or 0.0111 pound-moles (5.0444 gram-moles). Another common contaminant is HCl; at 200 ppm, the amount of hydrogen chloride is 1,000 lbs. of refrigerant is 0.2 lbs. or 0.0055 pound-mole (2.4877 gram-moles). The reactions involved using the decontaminant chemicals in the attached tables are as follows:

2 Si-OR+Water→Si-O-Si+ROH

RO-Na+Water→ROH+NaOH

RO-Na+HCl→ROH+NaCl

TABLE 1

(EXEMPLARY DECONTAMINANTS FOR REMOVAL OF WATER AND ACID FROM RECOVERED REFRIGERANTS)

| DECONTAMINANT | MOL. WT. | B.P. of Free Alcohol (Degree C.) | Lbs. Needed Per 1000 lb. of Refrig. (Water- 200 ppm) | Lbs. Needed Per 1000 lb. of Refrig (Acid- 200 ppm |
|---|---|---|---|---|
| 1. Octyltriethoxysilene | 276 | 78 | 1.81 | — |
| 2. Vinyltris-(2-methoxyethoxy) silane | 280 | 124 | 2.07 | — |
| 3. Dimethyldibutoxysilane | 204 | 118 | 2.27 | — |
| 4. Sodium salt of butyl alcohol | 96 | 118 | 1.07 | 0.54 |
| 5. Mixture of 25% sodium salt of butyl alcohol, 25% dimethyldibuutoxysilane and 50% butyl alcohol | — | 118 | 3.08 | 2.08 |

TABLE 1-continued (EXEMPLARY DECONTAMINANTS FOR REMOVAL OF WATER AND ACID FROM RECOVERED REFRIGERANTS)

| DECONTAMINANT | MOL. WT. | B.P. of Free Alcohol (Degree C.) | Lbs. Needed Per 1000 lb. of Refrig. (Water-200 ppm) | Lbs. Needed Per 1000 lb. of Refrig (Acid-200 ppm) |
|---|---|---|---|---|
| 6. Sodium salt of 2-ethylhexanol | 152 | 184 | 1.69 | 0.86 |
| 7. Sodium salt of methoxy-triglycol | 186 | Above 200 | 2.07 | 1.05 |
| 8. Sodium salt of methoxy-triglycol (50% solution in methoxy-triglycol) | — | Above 200 | 4.13 | 2.09 |
| 9. Sodium salt of Methyl-Carbitol | 142 | 193 | 1.58 | 0.8 |
| 10. Sodium salt of Methyl-Cellosolve | 98 | 124 | 1.09 | 0.55 |
| 11. Mono-sodium salt of ethylene glycol | 84 | 198 | 0.93 | 0.47 |
| 12. Product of di-isopropylene glycol and dimethyldichloro-silane | 190 | Above 177 | 2.11 | — |

The following example shows the great purity achieved by the invention, as shown by Table 2.

EXAMPLE

Tests were conducted on polluted refrigerant and then again on decontaminated refrigerant after it was purified according to the present invention.

A twenty pound batch of refrigerant 22 was contaminated to levels designated by ARI 740 (Table 1). This refrigerant was transferred in liquid phase into a test container according to the present invention containing two pounds of a liquid mixture of 50% vinyl tris(2-methoxyethoxy)silane and 50% of a 50—50 mixture of methoxy-triglycol and its sodium salt. This cylinder was then agitated, warmed to room temperature and allowed to sit for 2 hours.

After two hours, pre-cleaned hoses were attached to the vapor port of the test cylinder and then to the liquid port of a second evacuated cylinder which had been pre-cleaned so as not to introduce any new contaminants. This evacuated target cylinder was used to capture the refrigerant vapor and was placed into a liquid nitrogen bath to facilitate transfer. The valves between the test container and the pre-cleaned cylinder were then opened and the process began. The ambient temperature of the test container was maintained at 75° F. during the process. After the test container had achieved and maintained a vacuum in excess of 10 inches (EPA required vacuum level), the distillation was terminated and the target cylinder was allowed to warm to room temperature.

The refrigerant which had passed from the test container to the pre-cleaned target cylinder was then analyzed in accordance with ARI standard 700, "Specification for Fluorocarbon and Other Refrigerants"*. The comparative results are shown in Table 2 below:

*Purity standard for refrigerants promulgated by the Air Conditioning and Refrigeration Institute (ARI).

TABLE 2

|  | Batch Contaminated to ARI-740[1] | Final Product Afterwards[2] |
|---|---|---|
| Acidity[3] | 440 ppm | 0.68 ppm |
| Chloride[4] | Fail | Pass |
| HBR[5] | 5.1% | 0.02% |
| OR[6] | 0.1% | 0.1% |
| Particulate[7] | Fail | Pass |
| Moisture[8] | 202 ppm | 7 ppm |

[1]Contaminated batch as analyzed before transfer to target cylinder
[2]Final product analytical results of the target cylinder
[3]Acidity (ppm by weight)
[4]Chloride (pass/fail)
[5]HBR: High Boiling Residue (% by volume)
[6]OR: Other Refrigerants (% by weight)
[7]Particulate (pass/fail)
[8]Moisture (ppm by weight)

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. The means and materials for carrying out various disclosed functions may take a variety of alternative forms without departing from the invention. It is to be understood that the phraseology or terminology employed herein is for the purpose of description and not of limitation.

What is claimed is:

1. A method of decontaminating a fluid refrigerant containing an impurity, the refrigerant having a vaporization temperature, the method comprising:
   providing a container;
   providing a decontaminating liquid chemical within the container, the decontaminating liquid chemical having a vaporization temperature substantially higher than the vaporation temperature of the refrigerant and being chemically reactive with at least one of said impurities of the refrigerant to form a reaction product which has a vaporization temperature substantially higher than said refrigerant vaporization temperature;

introducing the refrigerant in liquid form into the decontaminating liquid chemical to form a liquid admixture in the container, whereby a reaction occurs between said at least one impurity in the refrigerant liquid and the decontaminating liquid chemical; and drawing off refrigerant vapor from the container;

whereby the refrigerant vapor leaving the container is purified relative to the liquid refrigerant injected into the container.

2. The method according to claim 1, wherein the decontaminating liquid reacts with water, where the water is an impurity.

3. The method according to claim 1, wherein the decontaminating liquid reacts with an acid, where the acid is an impurity.

4. The method according to claim 1, wherein the decontaminating liquid has a boiling temperature of at least 100° C.

5. An apparatus for decontaminating a liquid refrigerant with a decontaminating liquid chemical, the chemical being reactive with impurities in the refrigerant to form a reaction product and wherein the decontaminating liquid chemical and the reaction product have boiling temperatures substantially higher than the refrigerant vaporization temperature, the apparatus comprising:

a container having an upper end, a side wall, and a lower end adapted to contain a pool of decontaminating liquid;

an inlet into the container for liquid refrigerant;

a refrigerant vapor outlet from the container through the upper end of the container; and means for mixing the refrigerant and the chemical within the lower end of the container, comprising a tube having a top end communicating with the refrigerant inlet, a descending portion, and a discharge end at said lower end adapted to feed liquid refrigerant into the pool decontaminating liquid at said lower end;

whereby refrigerant injected via the tube into the container with the decontaminating liquid chemical therein to a liquid level above the discharge end of the tube, will mix with the chemical by swirling action, and generally pure refrigerant vapor may leave the container via the vapor outlet.

6. The container according to claim 5, comprising a one-way inlet valve coupled to the refrigerant inlet.

7. The container according to claim 5, comprising a one-way outlet valve coupled to the vapor outlet.

8. The container according to claim 5, wherein the discharge end of the tube includes a substantially horizontal end portion disposed adjacent the side wall.

9. The container according to claim 5, wherein the discharge end of the tube includes plural nozzles.

10. The container according to claim 5, including a thermal jacket disposed about the container.

11. An apparatus for decontaminating a fluid refrigerant, the apparatus comprising:

a container having an upper end and a lower end;

a refrigerant inlet to the container;

a refrigerant vapor outlet from the container through the upper end of the container;

a decontaminating liquid chemical disposed within the lower end of the container, the chemical having a chemical vaporization temperature higher than a refrigerant vaporization temperature and being reactive with impurities of the refrigerant to form a reaction product; and means for mixing the refrigerant with the chemical within the lower end of the container;

whereby generally pure refrigerant vapor may leave the container via the vapor outlet and the reaction product may remain in the container.

12. The apparatus according to claim 11, including a one-way inlet valve in the inlet.

13. The apparatus according to claim 11, including a one-way outlet valve in the outlet.

14. The container according to claim 11, including a thermal jacket disposed about the container.

* * * * *